(12) United States Patent
Saliou

(10) Patent No.: US 10,755,142 B2
(45) Date of Patent: Aug. 25, 2020

(54) AUTOMATED AND UNSUPERVISED GENERATION OF REAL-WORLD TRAINING DATA

(71) Applicant: Cognizant Technology Solutions U.S. Corporation, College Station, TX (US)

(72) Inventor: Antoine Saliou, San Francisco, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 113 days.

(21) Appl. No.: 16/150,101

(22) Filed: Oct. 2, 2018

(65) Prior Publication Data

US 2019/0073564 A1     Mar. 7, 2019

Related U.S. Application Data

(63) Continuation-in-part of application No. 16/122,695, filed on Sep. 5, 2018.
(Continued)

(51) Int. Cl.
*G06K 9/62* (2006.01)
*G06N 3/08* (2006.01)
(Continued)

(52) U.S. Cl.
CPC ........ *G06K 9/6256* (2013.01); *G06K 9/3241* (2013.01); *G06K 9/4628* (2013.01);
(Continued)

(58) Field of Classification Search
CPC ............. G06K 9/62; G06N 3/08; G06T 7/246
See application file for complete search history.

(56) References Cited

U.S. PATENT DOCUMENTS 5,696,964 A    12/1997  Cox et al.
5,930,784 A     7/1999  Hendrickson
(Continued)

OTHER PUBLICATIONS

"Shop the Look on Google" [online], Sep. 5, 2016 [retrieved on Apr. 4, 2019], Retrieved from the Internet: https://adwords.googleblog.com/2016/09/shop-look-on-google.html, 5 pp.
(Continued)

*Primary Examiner* — Mia M Thomas
(74) *Attorney, Agent, or Firm* — Bey & Cotropia, PLLC; Dawn-Marie Bey

(57) ABSTRACT

The technology disclosed uses a combination of an object detector and an object tracker to process video sequences and produce tracks of real-world images categorized by objects detected in the video sequences. The tracks of real-world images are used to iteratively train and re-train the object detector and improve its detection rate during a so-called "training cycle". Each training cycle of improving the object detector is followed by a so-called "training data generation cycle" that involves collaboration between the improved object detector and the object tracker. Improved detection by the object detector causes the object tracker to produce longer and smoother tracks tagged with bounding boxes around the target object. Longer and smoother tracks and corresponding bounding boxes from the last training data generation cycle are used as ground truth in the current training cycle until the object detector's performance reaches a convergence point.

13 Claims, 7 Drawing Sheets

Related U.S. Application Data

(60) Provisional application No. 62/554,424, filed on Sep. 5, 2017.

(51) Int. Cl.

| | | |
|---|---|---|
| *G06T 7/246* | (2017.01) | |
| *G06N 3/04* | (2006.01) | |
| *G06K 9/32* | (2006.01) | |
| *G06K 9/46* | (2006.01) | |

(52) U.S. Cl.
CPC .......... *G06N 3/0481* (2013.01); *G06N 3/084* (2013.01); *G06T 7/248* (2017.01); *G06T 7/251* (2017.01); *G06K 2009/3291* (2013.01); *G06T 2207/20081* (2013.01); *G06T 2207/20084* (2013.01); *G06T 2210/12* (2013.01)

(56) References Cited

U.S. PATENT DOCUMENTS

| | | | |
|---|---|---|---|
| 6,098,034 A | | 8/2000 | Razin et al. |
| 6,286,018 B1 | | 9/2001 | Pitkow et al. |
| 6,347,313 B1 | | 2/2002 | Ma et al. |
| 6,353,825 B1 | | 3/2002 | Ponte |
| 6,574,616 B1 | | 6/2003 | Saghir |
| 7,099,860 B1 | | 8/2006 | Liu et al. |
| 7,152,031 B1 | | 12/2006 | Jensen et al. |
| 7,200,243 B2 | | 4/2007 | Keenan et al. |
| 7,480,640 B1 | | 1/2009 | Elad et al. |
| 7,567,960 B2 | | 7/2009 | Wei et al. |
| 7,813,581 B1 | | 10/2010 | Fitzpatrick et al. |
| 7,814,107 B1 | | 10/2010 | Thirumalai et al. |
| 8,027,541 B2 | | 9/2011 | Hua et al. |
| 8,106,924 B2 | * | 1/2012 | Aliprandi ............ H04N 13/111 |
| | | | 345/629 |
| 8,150,822 B2 | | 4/2012 | Bluvband et al. |
| 8,160,939 B2 | | 4/2012 | Schrenk |
| 8,170,966 B1 | | 5/2012 | Musat et al. |
| 8,254,697 B2 | | 8/2012 | Isard et al. |
| 8,676,802 B2 | | 3/2014 | Zelevinsky et al. |
| 8,787,700 B1 | * | 7/2014 | Aly ................ G06K 9/00664 |
| | | | 382/294 |
| 8,832,134 B2 | | 9/2014 | Gronow et al. |
| 8,843,478 B1 | | 9/2014 | Jing et al. |
| 8,958,662 B1 | * | 2/2015 | Grosz ................ G06T 3/4038 |
| | | | 382/118 |
| 8,972,394 B1 | | 3/2015 | Tong et al. |
| 9,116,976 B1 | | 8/2015 | Bem et al. ........ G06F 17/30687 |
| 9,256,807 B1 | * | 2/2016 | Shlens ................ G06K 9/6215 |
| 9,607,014 B2 | * | 3/2017 | Wang ................ G06K 9/6263 |
| 9,824,692 B1 | * | 11/2017 | Khoury ................ G10L 17/18 |
| 9,836,641 B2 | | 12/2017 | Philbin ................ G06N 3/0454 |
| 9,852,351 B2 | | 12/2017 | Aguilera Perez .... H04N 13/221 |
| 10,102,277 B2 | | 10/2018 | Legrand et al. .. G06F 17/30687 |
| 10,360,732 B2 | * | 7/2019 | Krishnaswamy ...... H04N 7/185 |
| 10,521,691 B2 | * | 12/2019 | Najibikohnehshahri .................... |
| | | | G06K 9/00664 |
| 10,528,819 B1 | * | 1/2020 | Manmatha ............ G06K 9/6262 |
| 10,572,723 B2 | * | 2/2020 | Jiang ................ A63B 24/0062 |
| 2002/0091678 A1 | | 7/2002 | Miller et al. |
| 2002/0138478 A1 | | 9/2002 | Schwartz et al. |
| 2002/0164078 A1 | | 11/2002 | Uehara et al. |
| 2004/0107194 A1 | | 6/2004 | Thorpe |
| 2005/0165600 A1 | | 7/2005 | Kasravi et al. |
| 2006/0212415 A1 | | 9/2006 | Backer et al. |
| 2007/0011154 A1 | | 1/2007 | Musgrove et al. |
| 2007/0088534 A1 | | 4/2007 | MacArthur et al. |
| 2007/0174244 A1 | | 7/2007 | Jones |
| 2007/0288432 A1 | | 12/2007 | Weltman et al. |
| 2008/0126464 A1 | | 5/2008 | Mowzoon |
| 2008/0243842 A1 | | 10/2008 | Liang et al. |
| 2008/0285861 A1 | | 11/2008 | Mitarai et al. |
| 2008/0306943 A1 | | 12/2008 | Patterson |
| 2009/0016610 A1 | * | 1/2009 | Ma ................ G06K 9/00771 |
| | | | 382/195 |
| 2009/0132347 A1 | | 5/2009 | Anderson et al. |
| 2010/0104191 A1 | | 4/2010 | McGwire |
| 2010/0134415 A1 | | 6/2010 | Iwase et al. |
| 2010/0223258 A1 | | 9/2010 | Ghahramani et al. |
| 2010/0231689 A1 | * | 9/2010 | Bruls ................ H04N 19/00 |
| | | | 348/43 |
| 2010/0293117 A1 | | 11/2010 | Xu |
| 2011/0029561 A1 | | 2/2011 | Slaney et al. |
| 2011/0064316 A1 | | 3/2011 | Hamamura et al. |
| 2011/0173037 A1 | | 7/2011 | Attenberg et al. |
| 2011/0246409 A1 | | 10/2011 | Mitra |
| 2013/0191381 A1 | | 7/2013 | Jin et al. |
| 2013/0212090 A1 | | 8/2013 | Sperling et al. |
| 2013/0226922 A1 | | 8/2013 | Labenski et al. |
| 2013/0246439 A1 | | 9/2013 | Liekens et al. |
| 2013/0336588 A1 | | 12/2013 | Rane et al. |
| 2014/0019431 A1 | | 1/2014 | Suleyman et al. |
| 2014/0019484 A1 | | 1/2014 | Coppin et al. |
| 2014/0222789 A1 | | 8/2014 | Gras |
| 2014/0258195 A1 | | 9/2014 | Weng et al. |
| 2015/0036948 A1 | | 2/2015 | Wenzel et al. |
| 2015/0088871 A1 | | 3/2015 | Ruotsalo et al. |
| 2015/0170004 A1 | | 6/2015 | Song et al. ............. G06K 9/68 |
| 2015/0220833 A1 | | 8/2015 | Le ............ G06N 3/08 |
| 2015/0235160 A1 | | 8/2015 | Larlus-Larrondo et al. ................ |
| | | | G06Q 10/06398 |
| 2015/0286957 A1 | | 10/2015 | Knight ................ G06N 99/005 |
| 2015/0317344 A1 | | 11/2015 | Birdwell et al. ............ |
| | | | G06F 17/30327 |
| 2015/0363001 A1 | * | 12/2015 | Malzbender .......... G06F 3/0233 |
| | | | 706/18 |
| 2016/0078359 A1 | | 3/2016 | Csurka et al. ......... G06N 7/005 |
| 2016/0086052 A1 | * | 3/2016 | Piekniewski ........ G06K 9/4671 |
| | | | 382/103 |
| 2016/0155067 A1 | | 6/2016 | Dubnov et al. ....... G06N 99/005 |
| 2016/0180151 A1 | | 6/2016 | Philbin et al. ..... G06K 9/00288 |
| 2016/0196665 A1 | * | 7/2016 | Abreu ................ G06T 7/75 |
| | | | 345/427 |
| 2016/0275686 A1 | * | 9/2016 | Zach ................ G06K 9/6201 |
| 2016/0328856 A1 | * | 11/2016 | Mannino ................ G06T 7/73 |
| 2016/0350336 A1 | | 12/2016 | Checka et al. .... G06F 17/30268 |
| 2016/0379371 A1 | * | 12/2016 | Chen ................ G06K 9/4604 |
| | | | 382/173 |
| 2017/0031904 A1 | | 2/2017 | Legrand et al. .. G06F 17/30011 |
| 2017/0039198 A1 | | 2/2017 | Ramamurthy et al. ...................... |
| | | | G06F 17/3053 |
| 2017/0075977 A1 | * | 3/2017 | Yadav ................ G06F 16/7847 |
| 2017/0091319 A1 | | 3/2017 | Legrand et al. .. G06F 17/30687 |
| 2017/0177954 A1 | * | 6/2017 | Micks ................ G06T 17/05 |
| 2017/0255832 A1 | | 9/2017 | Jones et al. ........ G06K 9/00771 |
| 2017/0262735 A1 | * | 9/2017 | Ros Sanchez ........ G06K 9/6256 |
| 2017/0357896 A1 | | 12/2017 | Tsatsin et al. ........ G06N 3/084 |
| 2018/0082428 A1 | | 3/2018 | Leung ................ G06T 7/215 |
| 2018/0165548 A1 | | 6/2018 | Wang ................ G06K 9/2054 |
| 2018/0173725 A1 | | 6/2018 | De Guerre .......... G06F 16/5866 |
| 2018/0189647 A1 | * | 7/2018 | Calvo ................ G06N 5/022 |
| 2018/0204076 A1 | * | 7/2018 | Tripathi ................ G06K 9/4647 |
| 2019/0019012 A1 | * | 1/2019 | Huang ................ G06N 3/0454 |
| 2019/0073564 A1 | * | 3/2019 | Saliou ................ G06K 9/3241 |
| 2019/0122404 A1 | * | 4/2019 | Freeman ................ G06K 9/4652 |
| 2019/0130189 A1 | * | 5/2019 | Zhou ................ G06K 9/00771 |
| 2019/0130208 A1 | * | 5/2019 | Michael ................ G06K 9/54 |
| 2019/0180090 A1 | * | 6/2019 | Jiang ................ A63B 24/0062 |
| 2019/0205649 A1 | * | 7/2019 | Ananthanarayanan ...................... |
| | | | G06K 9/00711 |
| 2019/0228266 A1 | * | 7/2019 | Habibian ................ G06K 9/6262 |
| 2019/0244107 A1 | * | 8/2019 | Murez ................ G06N 3/084 |
| 2019/0244366 A1 | * | 8/2019 | Yu ................ G06N 3/0454 |
| 2019/0311202 A1 | * | 10/2019 | Lee ................ G06K 9/627 |
| 2019/0325275 A1 | * | 10/2019 | Lee ................ G06K 9/66 |
| 2020/0026954 A1 | * | 1/2020 | Rhodes ................ G06K 9/00718 |
| 2020/0045289 A1 | * | 2/2020 | Raziel ................ H04N 13/332 |
| 2020/0055515 A1 | * | 2/2020 | Herman ................ G05D 1/0088 |
| 2020/0125840 A1 | * | 4/2020 | Geng ................ G06K 9/00469 |

(56) References Cited

U.S. PATENT DOCUMENTS

| | | | |
|---|---|---|---|
| 2020/0134375 A1* | 4/2020 | Zhan | G06N 3/08 |
| 2020/0193141 A1* | 6/2020 | Tan | G06N 3/084 |

OTHER PUBLICATIONS

W. Liu, et al., "SSD: Single Shot Multibox Detector," arXiv:1512.02325, 2015.

L. Bertinetto, J. Valmadre, J. F. Henriques, A. Vedaldi, and P. H. Torr, "Fully-Convolutional Siamese Networks For Object Tracking," arXiv:1606.09549, 2016.

W. Luo, J. Xing, X. Zhang, X. Zhao, and T. K. Kim, "Multiple Object Tracking: A Literature Review," arXiv:1409.7618, 2014, updated May 22, 2017.

A. Milan, L. Leal-Taixe, L. Reid, S. Roth, and K. Schindler, "Mot16: A Benchmark For Multi-Object Tracking," arXiv:1603.00831, 2016.

A. Sadeghian, A. Alahi, and S. Savarese, "Tracking the Untrackable: Learning to Track Multiple Cues With Long-Term Dependencies," arXiv:1701.01909, 2017.

Allesiardo, et al., "A Neural Networks Committee for the Contextual Bandit Problem." Neural Information Processing. Springer International Publishing, 8 pages (2014).

Auer et al., "Finite-time analysis of the multiarmed bandit problem," Machine learning 47.2-3 (2002):235-256.

Bouneffouf, et al., "A contextual-bandit algorithm for mobile context-aware recommender system." Neural Information Processing. Springer Berlin Heidelberg, 9 pages. (2012).

Burnetas et al., "Optimal adaptive policies for sequential allocation problems." Advances in Applied Mathematics 17.2 (1996): 122-142.

Burnetas and Katehakis, "Optimal adaptives policies for Markov decision processes." Mathematics of Operations Research 22.1 (1997): 222-255.

Chu, et al., "Contextual bandits with linear payoff functions," In International Conference on Artificial Intelligence and Statistics, pp. 208-214 (2011).

Filippi, et al., "Optimism in reinforcement learning and Kullback-Leibler divergence." Communication, Control, and Computing (Allerton), 2010 48th Annual Allerton Conference on. IEEE, 22 pages (2010).

Gittins, "Bandit processes and dynamic allocation indices." Journal of the Royal Statistical Society. Series B (Methodological) (1979): 148-177.

Honda and Takemura, "An asymptotically optimal policy for finite support models in the multiarmed bandit problem." Machine Learning 85.3 (2011): 361-391.

Katehakis et al., "Sequential choice from several populations." Proceedings of the National Academy of Sciences of the United States of America 92.19 (1995): 8584-8585.

Katehakis et al., "The multi-armed bandit problem: decomposition and computation." Mathematics of Operations Research 12.2 (1987): 262-268.

Lai et al., "Asymptotically efficient adaptive allocation rules." Advances in applied mathematics 6.1 (1985): 4-22.

Langford and Zhang, "The epoch-greedy algorithm for multi-armed bandits with side information." In Advances in neural information processing systems, 8 page (2008).

Ortner, "Online regret bounds for Markov decision processes with deterministic transitions." Theoretical Computer Science 411.29 (2010): 2684-2695.

Perchet et al., "The multi-armed bandit problem with covariates." The Annals of Statistics, 41(2), 30 pages (2013).

Press, "Bandit solutions provide unified ethical models for randomized clinical trials and comparative effectiveness research." Proceedings of the National Academy of Sciences 106, No. 52 (2009): 22387-22392.

Rigollet, et al., "Nonparametric bandits with covariates." arXiv preprint arXiv:1003.1630, 18 pages (2010).

Robbins, "Some aspects of the sequential design of experiments." In Herbert Robbins Selected Papers, pp. 527-535 (1952).

Scott, "A modern Bayesian look at the multi-armed bandit." Applied Stochastic Models in Business and Industry 26.6 (2010): 639-658.

Slivkins, "Contextual bandits with similarity information." The Journal of Machine Learning Research 15.1, 30 pages. (2014).

Tewari and Bartlett, "Optimistic linear programming gives logarithmic regret for irreducible MDPs." Advances in Neural Information Processing Systems, 8 pages (2008).

Tokic, "Adaptive ?-greedy exploration in reinforcement learning based on value differences." KI 2010: Advances in Artificial Intelligence. Springer Berlin Heidelberg, 8 pages. (2010).

Tokic et al., "Value-difference based exploration: adaptive control between epsilon-greedy and softmax." KI 2011: Advances in Artificial Intelligence. Springer Berlin Heidelberg, 12 pages. (2011).

Valko, et al., "Finite-time analysis of kernelised contextual bandits." arXiv preprint arXiv:1309.6869, 10 pages (2013).

Vermorel et al., "Multi-armed bandit algorithms and empirical evaluation." Machine Learning: ECML 2005. Springer Berlin Heidelberg, 2005. 437-448.

Walsh, et al., "Exploring compact reinforcement-learning representations with linear regression," In Proceedings of the Twenty-Fifth Conference on Uncertainty in Artificial Intelligence, AUAI Press, pp. 591-598 (2009).

Weber, "On the Gittins index for multiarmed bandits." The Annals of Applied Probability 24 (1992): 1024-1033.

Ke, Yan, et al., "Efficient Near-duplicate Detection and Sub-image Retrieval", MM'04, Oct. 10-16, 2004, New York, 8 pages.

"Machine Learning", Wikipedia, http://en.wikipedia.org/wiki/Machine_learning, found on-line on Jul. 23, 2014, 7 pages.

"Search by Image—Inside Search—Google", http://www.google.com/insidesearch/features/images/searchbyimage.html downloaded from Internet on May 14, 2014, 3 pages.

"TinEye Reverse Image Search", http://www.tineye.com/, downloaded from the internet on May 14, 2014, 2 pages.

Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pages.

Bengio, Yoshua. "Learning Deep Architectures for AI", Foundations and Trends in Machine Learning, vol. 2, No. 1, published Nov. 15, 2009, pp. 1-71.

Boulton, Clint, "Google Image Swirl Renders Results Like Google Wonder Wheel," eWeek, http://eweek.com/search-engines/google-image-swirl-renders-results-like-google-wonder-wheel, Nov. 17, 2009 [downloaded May 29, 2020], 5 pp.

Dasgupta, Sanjoy, "Performance Guarantees for Hierarchical Clustering", Conference on Computational Learning Theory, Sydney, Australia, Jul. 8-10, 2002, pp. 351-363, 12 pages.

Van Leuken, Reimer H., et al., "Visual Diversification of Image Search Results", WWW '09 Proceedings of the 18th International Conference on World Wide Web, Apr. 20-24, 2009, Madrid, Spain, p. 341-350.

Tenenbaum, Joshua B., et al., "A Global Geometric Framework for Nonlinear Dimensionality Reduction", Science, vol. 290, Dec. 22, 2000, p. 2319-2323.

"Tf-idf," Wikipedia, http://en.wikipedia.org/wiki/Tf-idf [downloaded May 29, 2020], 4 pp.

Min, Rengiang, et al., "Deep Supervised t-Distributed Embedding", Proceedings of the 27th International Conference on Machine Learning, Haifa, Israel, Jun. 21-24, 2010; 8 pages.

"Bag-of-words model," Wikipedia, https://web.archive.org/web/20131010023013/http://en.wikipedia.org/wiki/Bag-of-words_model, Oct. 10, 2013 [downloaded May 27, 2020], 3 pp.

Cortes, Corinna, et al., "Algorithms for Learning Kernels Based on Centered Alignment", Journal of Machine Learning Research 13, published Mar. 2012, pp. 795-828.

Haussler, David, "Convolution Kernels on Discrete Structures", UCSC-CRL-99-10, University of California at Santa Cruz, Jul. 8, 1999, 38 pages.

(56) References Cited

OTHER PUBLICATIONS

Moreno, Pedro J., et al., "A Kullback-Leibler Divergence Based Kernel for SVM Classification in Multimedia Applications", in Advances in Neural Information Processing Systems 16, MIT Press, Jan. 9, 2004, 8 pages.

Lodhi, Huma, et al., "Text Classification using String Kernels", Journal of Machine Learning Research, vol. 2, published Feb. 2002, pp. 419-444.

Siddiquie, Behlat, et al., "Combining Multiple Kernels for Efficient Image Classification", Applications of Computer Vision (WACV), 2009 Workshop on, IEEE, Snowbird, Utah, Dec. 7-9, 2000, 8 pages.

"Reproducing Kernel Hilbert Space," Wikipedia, http://web.archive.org/web/20131016100346/http://en.wikipedia.org/wiki/Reproducing_kernel_Hilbert_space, Oct. 16, 2013 [downloaded May 29, 2020], 4 pp.

Hoi, Steven C.H., "Semi-Supervised Distance Metric Learning for Collaborative Image Retrieval", Computer Vision and Pattern Recognition, 2008, IEEE Conference on, Jun. 23-28, 2008, Anchorage, Alaska, 7 pages.

Yu, Jie, et al., "A New Study on Distance Metrics as Similarity Measurement", 2006 IEEE International Conference on Multimedia and Expo, Jul. 9-12, 2006, Toronto, Ontario, Canada, pp. 533-536, 4 pages.

Rubner, Yossi, et al., "The Earth Mover's Distance as a Metric for Image Retrieval",Stanford University, Department of Computer Science, Report No. CS-TN-98-86, Sep. 1998, pp. 1-20.

Vadivel, A., et al., "Performance Comparison of Distance Metrics in Content-based Image Retrieval Applications", Proceedings of International Conference on Information Technology, Jan. 2003, pp. 159-164, 6 pages.

"Sring metric," Wikipedia, http://web.archive.org/web/2013/0904174846/http://en.wikipedia.org/wiki/String_metric, Sep. 4, 2013 [downloaded May 29, 2020], 2 pp.

"Levenshtein distance,", Wikipedia, https://web.archive.org/web/20140717160140/http://en.wikipedia.org/wiki/Levenshtein_distance, Jul. 17, 2014 [downloaded May 27, 2020], 7 pp.

"Faceted search," Wikipedia, https://web.archive.org/web/20140504035320/http://en.wikipedia.org/wiki/Faceted_search, May 4, 2014 [downloaded May 27, 2020], 3 pp.

"Document retrieval," Wikipedia, https://web.archive.org/web/20140404231630/http://en.wikipedia.org/wiki/Document_retrieval, Apr. 4, 2014 [downloaded May 29, 2020], 3 pp.

"Web search engine," https://web.archive.org/web/20140504005002/http://en.wikipedia.org/wiki/Web_search_engine, May 4, 2014 [downloaded May 29, 2020], 10 pp.

Yang, Jing, et al., "Semantic Image Browser Bridging Information Visualization with Automated Intelligent Image Analysis", Proc. IEEE Symposium on Visual Analytics Scence and Technology (2006), Oct. 31-Nov. 2, 2006, Baltimore, MD, USA, 8 pages.

Kennedy, Lyndon, et al., "Generating Diverse and Representative Image Search Results for Landmarks", WWW 2008/Refereed Track: Rich Media, Apr. 21-25, 2008, Beijing, China, p. 297-306.

Schikuta, Erich, "Grid-Clustering A Fast Hierarchical Clustering Method for very Large Data Sets", Center for Research on Parallel Computing, Rice University, Houston, Texas, CRPC-TR93358, Nov. 1993, 18 pages.

Cai, Deng, et al., "Hierarchical Clustering of WWW Image Search Results Using Visual, Textual and Link Information", MM'04, Oct. 10-16, 2004, New York, NY, 8 pages.

"Linear regression," Wikipedia, https://web.archive.org/web/20140613163108/http://en.wikipedia.org/wiki/Linear_regression, Jun. 13, 2014 [downloaded May 29, 2020], 18 pp.

"Simplex," Wikipedia, https://web.archive.org/web/20140706024911/http://en.wikipedia.org/wiki/Simplex, 12 pp.

"Constrained optimization," Wikipedia, https://web.archive.org/web/20131114055454/http://en.wikipedia.org/wiki/constrained_optimization, Nov. 14, 2013 [downloaded May 29, 2020], 5 pp.

"Nonlinear dimensionality reduction," Wikipedia, https://web.archive.org/web/20131225161033/http://en.wikipedia.org/wiki/Nonlinear_dimensionality_reduction, Dec. 25, 2013 [downloaded May 29, 2020], 10 pp.

"Manifold," Wikipedia, https://web.archive.org/web/20140606042325/http://en.wikipedia.org/wiki/Manifold, Jun. 6, 2014 [downloaded May 29, 2020], 21 pp.

Hinton, Geoffrey and Rowels, Sam, "Stochastic Neighbor Embedding", Advances in Neural Information Processing Systems 15, Dec. 9-14, 2002, pp. 833-840, MIT Press, 8 pages.

"Multidimensional scaling," Wikipedia, https://web.archive.org/web/20140211040227/http://en.wikipedia.org/wiki/Multidimensional_scaling, Feb. 11, 2014 [downloaded May 29, 2020], 5 pp.

"Metric space," Wikipedia, https://web.archive.org/web/20131207121502/http://en.wikipedia.org/wiki/Metric_space, Dec. 7, 2013 [downloaded May 29, 2020], 11 pp.

"Vector space," Wikipedia, https://web.archive.org/web/20140723002807/http://en.wikipedia.org/wiki/Vector_space, Jul 23, 2014 [downloaded May 29, 2020], 26 pp.

Lanckriet, Gert R.G., et al., "Learning the Kernel Matrix with Semidefinite Programming", Journal of Machine Learning Resarch 5, published Jan. 2004, pp. 27-72.

Souza, Cesar, "Kernel Functions for Machine Learning Applications", http://crsouza.blogspot.com/2010/03/kernel-functions-for-machine-learning.html, posted Mar. 17, 2010, 19 pages.

Collins et al., "Convolution Kernels for Natural Language", Advances in Neural Information Processing 14, 2001, MIT Press, pp. 825-832, 8 pages.

"String kernel," Wikipedia, https://web.archive.org/web/2013005234915/http://en.wikipedia.org/wiki/String_kernel, Oct. 5, 2013 [downloaded May 29, 2020], 2 pp.

"Radial basis function kernel," Wikipedia, https://web.archive.org/web/20140711061128/http://en.wikipedia.org/wiki/RBF_kernel, Jul. 11, 2014 [downloaded May 29, 2020], 2 pp.

"Polynomial kernel," https://we.archive.org/web/20140413092034/http://en.wikipedia.org/wiki/Polynomial_kernel, Apr. 13, 2014 [downloaded May 27, 2020], 2 pp.

"Kernel method," Wikipedia, https://web.archive.org/web/20140608030258/http://en.wikipedia.org/wiki/Kernel_method, Jun. 8, 2014 [downloaded May 27, 2020], 4 pp.

"Bregman divergence," Wikipedia, https://web.archive.org/web/20121018041028/http://en.wikipedia.org/wiki/Bregman_divergence, Oct. 18, 2012 [downloaded May 27, 2020], 4 pp.

"Distance," Wikipedia, https://web.archive.org/web/20140301042810/http://en.wikipedia.org/wiki/distance, Mar. 1, 2014 [downloaded May 29, 2020], 6 pp.

Balasubramanian, Mukund, and Schwartz, Eric L., "The Isomap Algorithm and Topological Stability", Science, vol. 295, Jan. 4, 2002, p. 7a, 3 pages.

"Metric Tree," Wikipedia, https://web.archive.org/web/20131019183134/http://en.wikipedia.org/wiki/Metric_tree, Oct. 19, 2013 [downloaded May 29, 2020], 2 pp.

Ishiwake et al., "Mind Reader Querying Databases Through Multiple Examples," VLDB'98, Proceedings of 24th International Conference on Very Large Data Bases, Aug. 24-27, 1998, New York City, pp. 218-227.

Drucker et al., "Support Vector Machines: Relevance Feedback and Information Retrieval,"Information Processing and Management 38 (2002), pp. 305-323 (accepted May 11, 2001).

Rui et al., "Relevance Feedback: A Power Tool for Interactive Content-Based Image Retrieval," Circuits and Systems for Video Technology, IEEE Transactions on, vol. 8, No. 5, Sep. 1998, pp. 1-13.

Tieu et al., "Boosting Image Retrieval," International Journal of Computer Vision 56(1/2), pp. 17-36, 2004 (Accepted Jul. 16, 2003).

Tong, et al., "Support Vector Machine Active Learning for Image Retrieval," In Proceedings of the ACM International Conference on Multimedia, 12 pages, ACM Press, 2001.

Kovashka, et al., "WhittleSearch: Image Search with Relative Attribute Feedback," Proceedings of the IEEE Conference on Computer Vision and Pattern Recognition (CVPR) (2012) 8 pages.

Zhou, et al., "Relevance Feedback in Image Retrieval: A Comprehensive Review," Multimedia Systems, vol. 8, pp. 536-544, 2003.

(56) References Cited

OTHER PUBLICATIONS

Manning et al., Introduction to Information Retrieval, Chapter 9: Relevance Feedback and Query Expansion, Cambridge University Press, Apr. 1, 2009, pp. 177-194.

He, Jingrui, et al. "Manifold-ranking based image retrieval." Proceedings of the 12th annual ACM international conterence on Multimedia. ACM, 2004, pp. 9-16.

Zhang et al., "iFind-A Sstem for Semantics and Feature Based Image Retrieval Over Internet," Proc. ACM Multimedia, ACM Press 2000, 2 pages.

Fang, et al., "Experiments in mental face retrieval." Audio-and Video-Based Biometric Person Authentication. Springer Bertin Heidelberg, 2005, 10 pages.

Vinay, et al. "Evaluating relevance feedback algorithms for searching on small displays." Advances in Information Retrieval. Springer Berlin Heidelberg, 2005. 185-199.

Vinay, et al. "Evaluating relevance feedback and display strategies for searching on small displays."String Processing and Information Retrieval. Springer Berlin Heidelberg, 2004, 2 pages.

Datta, et al. "Image retrieval: Ideas, Influences, and Trends of the New Age."ACM Computing Surveys (CSUR) 40.2 (2008): 5, 60 pages.

Tao et al., "Asymmetric Bagging and Random Subspace for Support Vector Machines-Based Relevance Feedback in Image Retrieval," IEEE Transactions on Pattern Analysis and Machine Intelligence, vol. 28, No. 7, Jul. 2006, pp. 1088-1099.

Cox, et al. "The Bayesian Image Retrieval System, PicHunter: Theory, Implementation, and Psychophysical Experiments." Image Processing, IEEE Transactions on 9.1 (2000): pp. 20-31.

Cox, et al. "An Optimized Interaction Strategy for Bayesian Relevance Feedback." Computer Vision and Pattern Recognition, 1998. Proceedings. 1998 IEEE Computer Society Conference on. IEEE, 1998, 6 pages.

Cox, et al. "Pichunter. Bayesian relevance feedback for image retrieval." Pattern Recognition, 1996., Proceedings of the 13th International Conference on. vol. 3. IEEE, 1996, 9 pages.

"Rocchio Algorithm," https://web.archive.org/web/2015031822071/http://en.wikipedia.org/wiki/Rocchio_algorithm, Mar. 18, 2015 [downloaded May 27, 2020], 3 pp.

"Online Machine Learning," Wikipedia, http://en.wikipedia.org/wiki/Online_machine_learning, accessed Apr. 29, 2015, 6 pages.

U.S. Appl. No. 14/494,364—Office Action dated Jun. 2, 2017, 61 pages (GNFN 3120-2).

U.S. Appl. No. 14/494,364—Response to Office Action dated Jun. 2, 2017, filed Nov. 2, 2011, 25 pages (GNFN 3120-2).

U.S. Appl. No. 14/494,364—Final Office Action dated Feb. 5, 2018, 38 pages (GNFN 3120-2).

U.S. Appl. No. 15/373,179—Notice of Allowance dated Jun. 11, 2018, 29 pages, (GNFN 3180-2).

U.S. Appl. No. 14/494,364—Response to Final Office Action dated Feb. 5, 2018, filed May 1, 2018, 33 pages (GNFN 3120-2).

U.S. Appl. No. 14/494,364—Office Action dated Jun. 27, 2018, 31 pages (GNFN 3120-2).

U.S. Appl. No. 15/311,163—Office Action dated Dec. 26, 2018, 47 pages (GNFN 3120-11).

"Use Gmail offline with Google Gears," GeniusHackers.Com, https://web.archive.org/web/20090130114621/http://geniushackers.com/blog/2009/01/28/use-gmail-offline-with-google-gears/, Jan. 28, 2009 [downloaded May 29, 2020], 7 pp.

U.S. Appl. No. 15/311,163—Response to Office Acton dated Dec. 26, 2018 filed Mar. 26, 2019, 18 pages (GNFN 3120-11).

U.S. Appl. No. 15/311,163—Notice of Allowance dated Apr. 19, 2019, 12 pages (GNFN 3120-11).

U.S. Appl. No. 15/311,163—Notice of allowance dated Jul. 29, 2019, 10 pages (GNFN 3120-11).

U.S. Appl. No. 15/295,930—Office Action dated Apr. 24, 2019, 8 pages (GNFN 3160-2).

U.S. Appl. No. 15/295,930—Response to Office Action dated Apr. 24, 2019 filed Aug. 26, 2019, 14 pages (GNFN 3160-2).

U.S. Appl. No. 15/295,930—Notice of Allowance dated Nov. 14, 2019, 15 pages (GNFN 3160-2).

"Multi-armed bandit," Wikipedia, https://web.archive.org/web/20150331085305/http://en.wikipedia.org/wiki/Multi-armed_bandit, Mar. 31, 2015 [downloaded May 27, 2020], 10 pp.

"k-mean clustering," Wikipedia, https://web.archive.org/web/20150412222522/http://en.wikipedia.org/wiki/K-means_clustering, Apr. 12, 2015 [downloaded May 29, 2020], 14 pp.

"k-medoids," Wikipedia, https://web.archive.org/20150330092112/http://en.wikipedia.org/wiki/K-medoids, Mar. 30, 2015 [downloaded May 29, 2020], 6 pp.

Brisaboa et al., "Spatial Selection of Sparse Pivots for Similarity Search in Metric Spaces," JCS&T vol. 7 No. 1, Apr. 2007, 6 pages.

Elad, et al., "Content Based Retrieval of VRML Objects—An Iterative and Interactive Approach," Springer Vienna, 2002, 12 pages.

Collins, et al., "New Ranking Algorithms for Parsing and Tagging: Kernels Over Discrete Structures, and the Voted Perceptron," ACL '02 Proceedings of the 40th Annual Meeting on Association for Computational Linguistics, 2002, 9 pages.

Freund, et al., "An Efficient Boosting Algorithm for Combining Preferences," Journal of Machine Learning Research 4 (2003) 37 pages.

International Search Report and Written Opinion for PCT/IB2015/001267, dated Nov. 19, 2015, 9 pp.

Cesa-Bianchi et al., "Prediction, Learning, and Games," Cambridge University Press, 2006, 403 pages.

PCT/IB2015/001267—International Preliminary Report on Patentability dated Nov. 15, 2016, 7 pages (GNFN 3120-3 WO).

Johnson, "Approximation Algorithms for Combinatorial Problems", MIT, 1974, pp. 38-49 (GNFN 3160-1 US).

"Package WeightedCluster," https://cran.r-project.org/packages/WeightedCluster/WeightedCluster.pdf, Feb. 19, 2015 [downloaded May 29, 2020], 16 pp.

"Bayes' theorem," Wikipedia, https://web.archive.org/web/20161107223719/https://en.wikipedia.org/wiki/Bayes'_theorem, Nov. 7, 2016 [downloaded May 27, 2020], 12 pp.

"Thompson sampling," Wikipedia, https://web.archive.org/web/20161025043013/https://en.wikipedia.org/wiki/Thompson_sampling, Oct. 25, 2016 [downloaded May 29, 2020], 3 pp.

Cristianini, Nello, "Kernel Methods for Pattern Analysis," UC Davis, nello@support-vector.net, [downloaded May 29, 2020], 31 pp.

"Random projection," Wikipedia, https://web.archive.org/web/20150906023635/https://en.wikipedia.org/wiki/Random_projection, Sep. 6, 2015 [downloaded May 27, 2020], 2 pp.

"Metropolis-Hastings algorithm," Wikipedia, https://web.archive.org/web/20160123051755/https://en.wikipedia.org/wiki/Metropolis-Hastings_algorithm, Jan. 23, 2016 [downloaded May 29, 2020], 7 pp.

"Markov chain Monte Carlo", Wikipedia, https://en.wikipedia.org/wiki/Markov_chain_Monte_Carlo, accessed Mar. 7, 2016, 6 pages.

Studer, "WeightedCluster Library Manual: A practical guide to creating typologies of trajectories in the social sciences with R," LIVES Working Papers, 24 pages (2013).

Agrawal et al., "Analysis of Thompson Sampling for the multi-armed bandit," J MLR: Workshop and Conference Proceedings vol. 23 (2012). 26 pages.

Herbster et al., "Tracking the Best Linear Predictor, Journal of Machine Learning Reseaarch," Sep. 2001, 29 pages.

Herbster et al, Tracking the Best Expert, Machine Learning, 32, 1998, 28 pages.

Chapelle et al, "An empirical evaluation of thompson sampling," Advances in neural information processing systems. 2011, 9 pages.

PCT/IB16/057510—International Search Report and Written Opinion dated Apr. 12, 2017, 22 pages (GNFN 3180-3WO).

GB 1621341.5—Voluntary Amendment dated Feb. 23, 2017, 47 pages (GNFN 3120-9 GB).

PCT/IB2016/001590—International Search Report and Written Opinion dated May 11, 2017, 11 pages (GNFN 3160-3 WO).

Stasko, et al., "Jigsaw: Supporting Investigative Analysis Through Interactive Visualization." Information Visualization 7.2 (2008): 118-132.

(56) References Cited

OTHER PUBLICATIONS

PCT/IB16/01593—International Search Report and Written Opinion dated May 22, 2017, 14 pages (GNFN 3230-3WO).
U.S. Appl. No. 14/494,364—Response to Office Action dated Jun. 2, 2017, filed Nov. 2, 2017, 25 pages (GNFN 3120-2).
U.S. Appl. No. 15/373,897—Office Action dated Nov. 9, 2017 12 pages, (GNFN 3180-2).
U.S. Appl. No. 15/373,897—Response to Office Action dated Nov. 9, 2017, filed Apr. 3, 2018, 35 pages, (GNFN 3180-2).
U.S. Appl. No. 14/494,384—Response to Final Office Action dated Feb. 5, 2018, filed May 1, 2018, 33 pages (GNFN 3120-2).
PCT/IB16/057510—International Preliminary Report on Patentability (Chap 1) dated Jun. 21, 2018, 13 pages (GNFN 3180-3WO).
PCT/IB16/01593—International Preliminary report on Patentability (Chap 1) dated Apr. 26, 2018, 9 pages (GNFN 3230-3WO).
U.S. Appl. No. 15/295,930—Office Action dated Jan. 28, 2019, 33 pages (GNFN 3160-2).
Sorokin et al., "Utility Data Annotation with Amazon Mechanical Turk," IEEE (2008) (Year: 2008).
Yanagimoto et al., "Document Similarity Estimation for Sentiment Analysis using Neural Network," IEEE (2013) (Year: 2013).
Kingma et al., "Auto-Encoding Variational Bayes," (2014) (Year: 2014).
Wang et al., "Unsupervised Learning of Visual Representations using Videos,"ICCV (2015) (Year: 2015).
Schroff et al., "FaceNet: A Unified Embedding for Face Recognition and Clustering," CVPR (2015) (Year: 2015).
PCT/IB2017/53442—International Search Report dated Nov. 13, 2017, 11 pages (GNFN 3240-3).
Hoffer et al., "Deep metric learning using triplet network," In International Workshop on Similarity-Based Pattern Recognition, pp. 84-92. Springer, Cham, 2015.
Zhang et al., "Embedding label structures for fine-grained feature representation," In Proceedings of the IEEE Conference on Computer Vision and Pattern Recognition, 2016, pp. 1114-1123.

* cited by examiner

AUTOMATED AND UNSUPERVISED GENERATION OF REAL-WORLD TRAINING DATA

CROSS-REFERENCE TO OTHER APPLICATIONS

This application is a Continuation-in-Part of U.S. Ser. No. 16/122,695, entitled "AUTOMATED AND UNSUPERVISED GENERATION OF REAL-WORLD TRAINING DATA", filed Sep. 5, 2018, which claims the benefit of U.S. Provisional Application No. 62/554,424, entitled "AUTOMATED AND UNSUPERVISED GENERATION OF REAL-WORLD TRAINING DATA", filed on Sep. 5, 2017, which are both incorporated by reference for all purposes as if fully set forth herein.

U.S. Nonprovisional patent application Ser. No. 15/295,926, entitled "Visual Interactive Search, Scalable Bandit-Based Visual Interactive Search And Ranking For Visual Interactive Search", filed on Oct. 17, 2016, which is incorporated by reference for all purposes as if fully set forth herein;

U.S. Nonprovisional patent application Ser. No. 15/295,930, entitled "Selection Of Initial Document Collection For Visual Interactive Search", filed on Oct. 17, 2016, which is incorporated by reference for all purposes as if fully set forth herein;

U.S. Nonprovisional patent application Ser. No. 15/373,897, entitled "Bayesian Visual Interactive Search", filed on Dec. 9, 2016, which is incorporated by reference for all purposes as if fully set forth herein; and U.S. Nonprovisional patent application Ser. No. 15/619,299, entitled "Content Embedding Using Deep Metric Learning Algorithms", filed on Jun. 9, 2017, which is incorporated by reference for all purposes as if fully set forth herein.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed relates to automated and unsupervised generation of real-world training data, and in particular, relates to training convolutional neural networks (CNNs) using automatically generated real-world training images.

BACKGROUND

Regarding "real-world data," one of the most challenging aspects of generating training data is that the training data should resemble an underlying distribution of "real-world data." "Real-world data" is data that is similar to what a user is trying to match when a user is presented with documents or images on a screen.

The outcome of the service is only as good as the trained model. Use of better or more comprehensive training data allows for the creation of a better (e.g., more accurate or realistic) model, because the model is only as "smart" as the data that was used for training. This is why it is important to improve the training data generation process. Training data should satisfy two important aspects—(i) comprehensiveness, i.e., having richly tagged real-world images that are captured in a wide spectrum of uncontrolled environments (e.g., arbitrary poses, textures, backgrounds, occlusion, illumination) so that the model is proficient at handling a diverse array of image requests from the customers during production and (ii) scale, i.e., having large amounts of such tagged real-world images so that the model is adequately trained. There exists a shortage of such training data because collecting and tagging real-world images is tedious, time consuming, and error prone.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
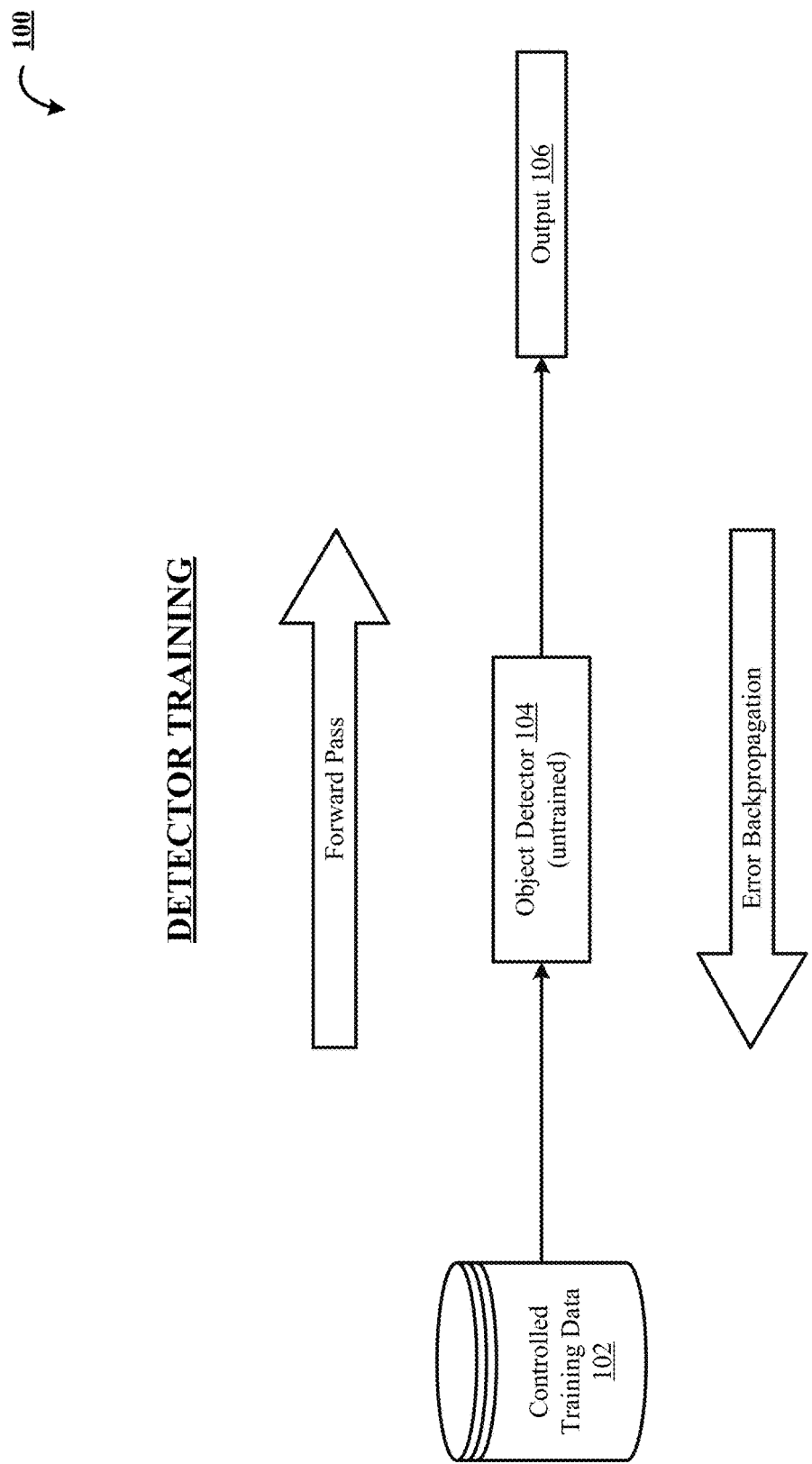
FIG. 1 shows one implementation of training an object detector.

Roughly described, the technology disclosed relates to an overall process of providing a service using a trained model. The trained model uses algorithms for generating predictions in the form of images and/or screens that are believed to draw the customer to their target image (e.g., an image in their mind that they are trying to reach, such as a specific product). The images and/or screens are produced using embeddings created by the trained model.

An automatic and unsupervised framework is proposed for collecting and labelling real-world images in real-world video sequences. The proposed framework uses a combination of an object detector and an object tracker to process video sequences and produce tracks of real-world images categorized by objects detected in the video sequences. The tracks of real-world images are used to iteratively train and re-train the object detector and improve its detection rate during a so-called "training cycle". Each training cycle of improving the object detector is followed by a so-called "training data generation cycle" that involves collaboration between the improved object detector and the object tracker. Improved detection by the object detector causes the object tracker to produce longer and smoother tracks tagged with bounding boxes around the target object. Longer and smoother tracks and corresponding bounding boxes from the last training data generation cycle are used as ground truth in the current training cycle until the object detector's performance reaches a convergence point (or some other termination condition is achieved).

Over time, longer and smoother tracks and corresponding bounding boxes are collected and stored in a tagged real-world training database with minimal or no manual intervention. This database is then used to train a convolutional neural network (CNN)-based model (also called "embedding model") that learns an embedding function for image retrieval. The trained model is further used to generate embeddings for catalog images so they can populate an embedding space. In one implementation, the embedding model can be trained using a triplet network architecture. The triplet network can include three convolutional neural networks that share weights and are branched in parallel. The convolutional neural networks are the underlying neural networks of the embedding model. The triplet network, and thus the underlying convolutional neural networks, are trained by making the embedding produced by each convolutional neural network enforce a metric defined at the image level, i.e., if image B is closer to image A than image C, then embedding B should be closer to embedding A than embedding C.

When inputs can be grouped into categories and there are several examples in each category, the embeddings can be learned using a classification task. The goal of the classification task is to put, as close as possible, embeddings of inputs of the same category. To operationalize the classification task, the embedding model can be augmented to include one or more fully-connected layers and a terminal softmax classification layer.

During production, the trained model produces a real-time embedding of a user selected image. The real-time embedding is then compared to embeddings of catalog images in the embedding space to produce a ranked set of catalog images that are presented as suggestions to the user.

In one use case, the technology disclosed uses the framework to improve the "Shop the Look" service. With Shop the Look service, users search the Internet for a product (e.g., an outfit like "cocktail dress" or furniture piece like "echelon round side table") and the search platform pulls in images that match the product description. Once users tap on one of those images, the search platform suggests a gallery of exact (or visually similar) items featured in the selected image, as well as a link to purchase them. More information about the Shop the Look service can be found at "https://adwords.googleblog.com/2016/09/shop-look-on-google.html", which is incorporated by reference for all purposes as if fully set forth herein.

Typically, in the Shop the Look service, the user selected image is a real-world image ("wild" image) and the suggested gallery includes synthetic images that are taken in a controlled and constrained environment. For example, the wild image is generally of a person wearing a dress and the suggested gallery is composed of catalog images of the dress and other related accessories taken in a studio and subjected to post-production edits (e.g., highlights, exposure, shadows, clarity, contrast, vibrance, saturation). The catalog images may or may not include a person.

The Shop the Look service uses an object detector to detect the product depicted by the user selected wild image and uses a ranking system to suggest and rank the catalog images (which are stored in a catalog database) relative to the wild image. Suggestion and ranking in this context is a challenge. During learning, the ranking system is trained on synthetic catalog images (e.g., with a white background, neutral pose, and frontal illumination). But, during production, the ranking system is tasked with mapping wild images to catalog images. It is very difficult for such a system to achieve a good ranking because of the significant difference between the user selected wild images and the controlled images in the catalog database.

The technology disclosed improves the object detector and the ranking system of the Shop the Look service by training them over a greater and more diverse quantity of real-world product images produced by its automatic and unsupervised framework discussed above. In other use cases, the technology disclosed can be applied to additional or different services, such as the ones involving different products like cars, smartphones, and so on.

FIG. 1 shows one implementation of training 100 an object detector 104. One example of an object detector is a convolutional neural network (CNN)-based single shot multibox detector (SSD) described in W. Liu, D. Anguelov, D. Erhan, C. Szegedy, and S. Reed, "SSD: Single shot multibox detector," arXiv:1512.02325, 2015, which is incorporated by reference for all purposes as if fully set forth herein. Object detector 104 is trained on controlled training data 102 that is mostly composed of synthetic images. The training includes forward pass that produces an output 106 and backpropagation of error that updates that the weights of the object detector 104 and improves its detection rate on controlled images.

Figure 2:
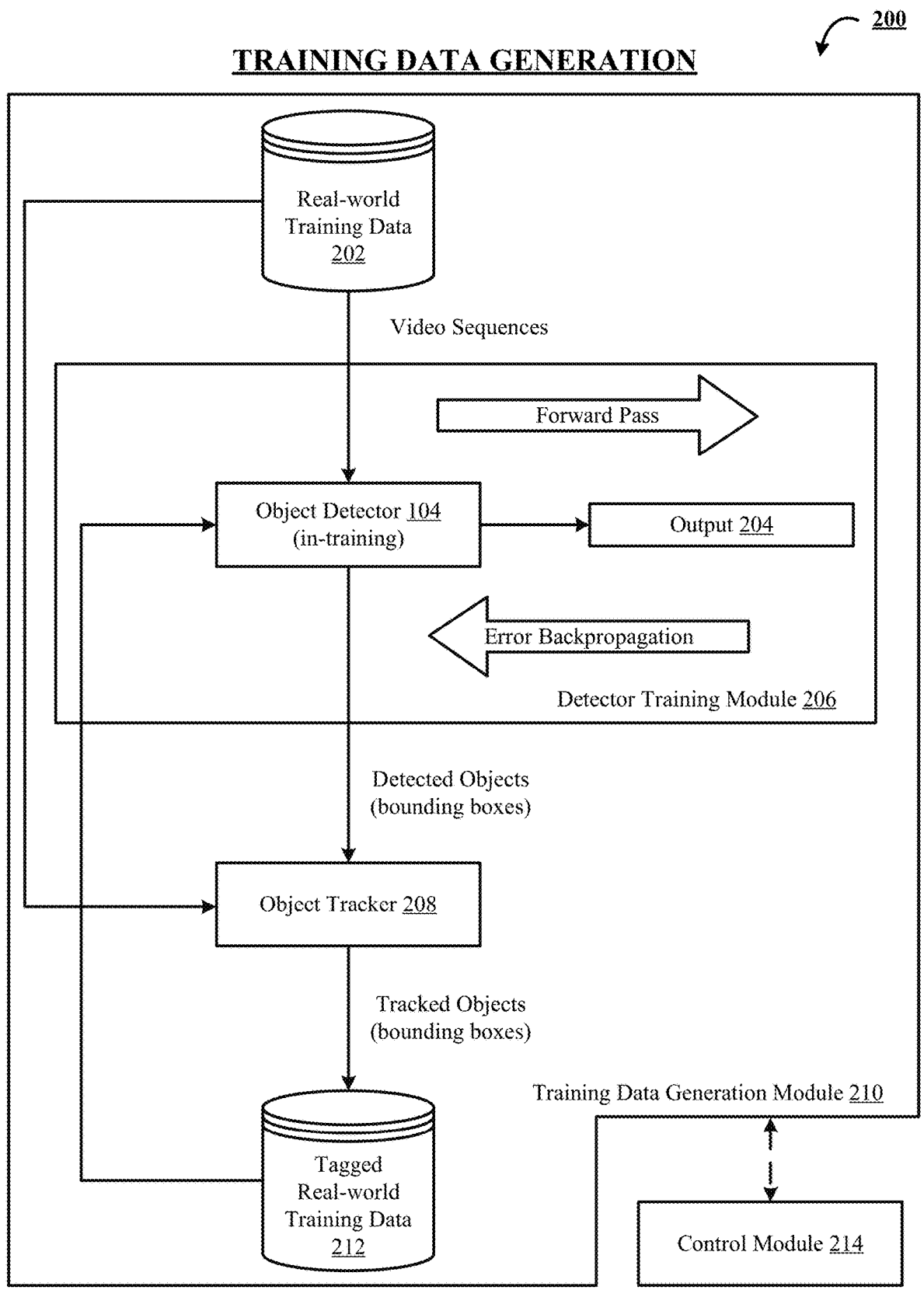
FIG. 2 is a block diagram that illustrates various aspects of the technology disclosed.

FIG. 2 is a block diagram 200 that illustrates various aspects of the technology disclosed. FIG. 2 comprises two modules—detector training module 206 and training data generation module 210. Detector training module 206 implements the training cycle and training data generation module 210 implements the training data generation cycle. Different from FIG. 1, in FIG. 2, the object detector 104 is "in-training" and receives as input real-world training data 202. In one implementation, training data 202 is composed of real-world video sequences.

In the initial training cycle, because the objector detector 104 was trained on controlled training data 102, its detection rate on the real-world video frames is not very high. For example, in a video sequence depicting a fashion show, a small variation in the clothing shape may cause the object detector 104 to make missing detections, false detections, or non-accurate bounding boxes. This results in short and inaccurate tracks of video frames whose utility in the creation of comprehensive and scaled real-world training data is very limited.

To overcome this problem, the disclosed algorithm uses a combination of object detector 104 and object tracker 208 to produce long and smooth tracks of real-world video frames. Each frame of a video sequence is processed by the object detector 104 and the object tracker 208. Object detector 104 detects a target object in a frame and creates a bounding box around the detected target object. Object tracker 208 determines whether and where the target object detected by the object detector 104 appears in successive frames and creates bounding boxes around the tracked target object.

One example of the object tracker 208 is a fully convolutional siamese network described in L. Bertinetto, J. Valmadre, J. F. Henriques, A. Vedaldi, and P. H. Torr, "Fully-convolutional siamese networks for object tracking," arXiv:1606.09549, 2016, which is incorporated by reference for all purposes as if fully set forth herein. For additional examples of the object tracker 208, reference can be made to W. Luo, J. Xing, X. Zhang, X. Zhao, and T.-K. Kim, "Multiple object tracking: A literature review," arXiv:1409.7618, 2014; A. Milan, L. Leal-Taixe, I. Reid, S. Roth, and K. Schindler, "Mot16: A benchmark for multi-object tracking," arXiv:1603.00831, 2016; and A. Sadeghian, A. Alahi, and S. Savarese, "Tracking the untrackable: Learning to track multiple cues with long-term dependencies," arXiv:

1701.01909, 2017, which are incorporated by reference for all purposes as if fully set forth herein.

When the tracked target object disappears, the object tracker 208 terminates the tracking and interleaves, in a new track, all the frames that contained the target object. The interleaved frames are then tagged with corresponding bounding boxes and stored as tagged real-world training data 212 on a track-by-track basis. In one implementation, the tracks are categorized based on the type of the target object contained in the constituent frames (e.g., dress, skirt, pant).

Accordingly, in one implementation, the training data generation cycle comprises the following steps—(1) providing real-world training data 202 (video sequences) to the object detector 104 and producing frames with bounding boxes around the detected objects, (2) providing the frames and the bounding boxes to the object tracker 208 and producing additional frames with bounding boxes around the tracked objects, and (3) storing pairs of additional frames and corresponding bounding boxes on a track-by-track basis as the tagged real-world training data 212.

The tagged real-world training data 212 is then used in the next training cycle as input to the object detector 104. Note that, in training data generation cycle, the input to the object detector 104 is the real-world training data 202 (video sequences). In contrast, in training cycle, the input to the object detector 104 is the tagged real-world training data 212. That is, the object detector 104 is re-trained using the most recent version of the tagged real-world training data 212 produced in the previous training data generation cycle to produce output 204.

After the current training cycle ends, the improved object detector 104 is used to execute the first step of the following training data generation cycle, as discussed above. This continues until the performance of the object detector 102 reaches a convergence point (or some other termination condition is achieved).

Thus, the diversity (comprehensiveness) and size (scale) of the tagged real-world training data 212 enhances with each training data generation cycle because the improved object detector 104 makes more frequent and accurate detections and in turn enables the object tracker 208 to produce longer, smoother, and more continuous tracks of real-world video frames tagged with corresponding bounding boxes.

Some implementations include removing noise from the tracks using human input before feeding them to the object detector 104 for re-training. Some implementations also include using a subset of frames from a track to re-train the object detector 104. Some implementations also include using human input to select the area to track in a video sequence and to determine when to stop tracking.

The enhanced tagged real-world training data 212 improves the performance of the object detector 104 in the subsequent training cycle, with the corresponding bounding boxes serving as ground truth. A control module 214 iterates the training cycle and the training data generation cycle.

In one implementation, the object detector 104 is re-trained using just those frames and corresponding bounding boxes that the object detector 104 was unable to detect in the previous training data generation cycle and that were instead tracked by the object tracker 208.

Upon convergence (or termination) in FIG. 2, the most recent version of the tagged real-world training data 212 is used to train a model that generates embeddings, i.e., an embedding model. The embedding model can be trained using a triplet network approach and/or by adding classification layers on top of it and using a classification approach.

Thus, the embedding model can be trained using one specific task (e.g., triplet or classification) or trained using a multi-tasks approach by combining multiple tasks. For example, one epoch over two, the embedding model can be trained using the triplet approach such that the underlying convolutional neural networks of the embedding model are part of the triplet network architecture and, one epoch over two, the same embedding model can be trained using a classification approach such that the underlying convolutional neural networks of the embedding model are part of the classification network.

Figure 3:
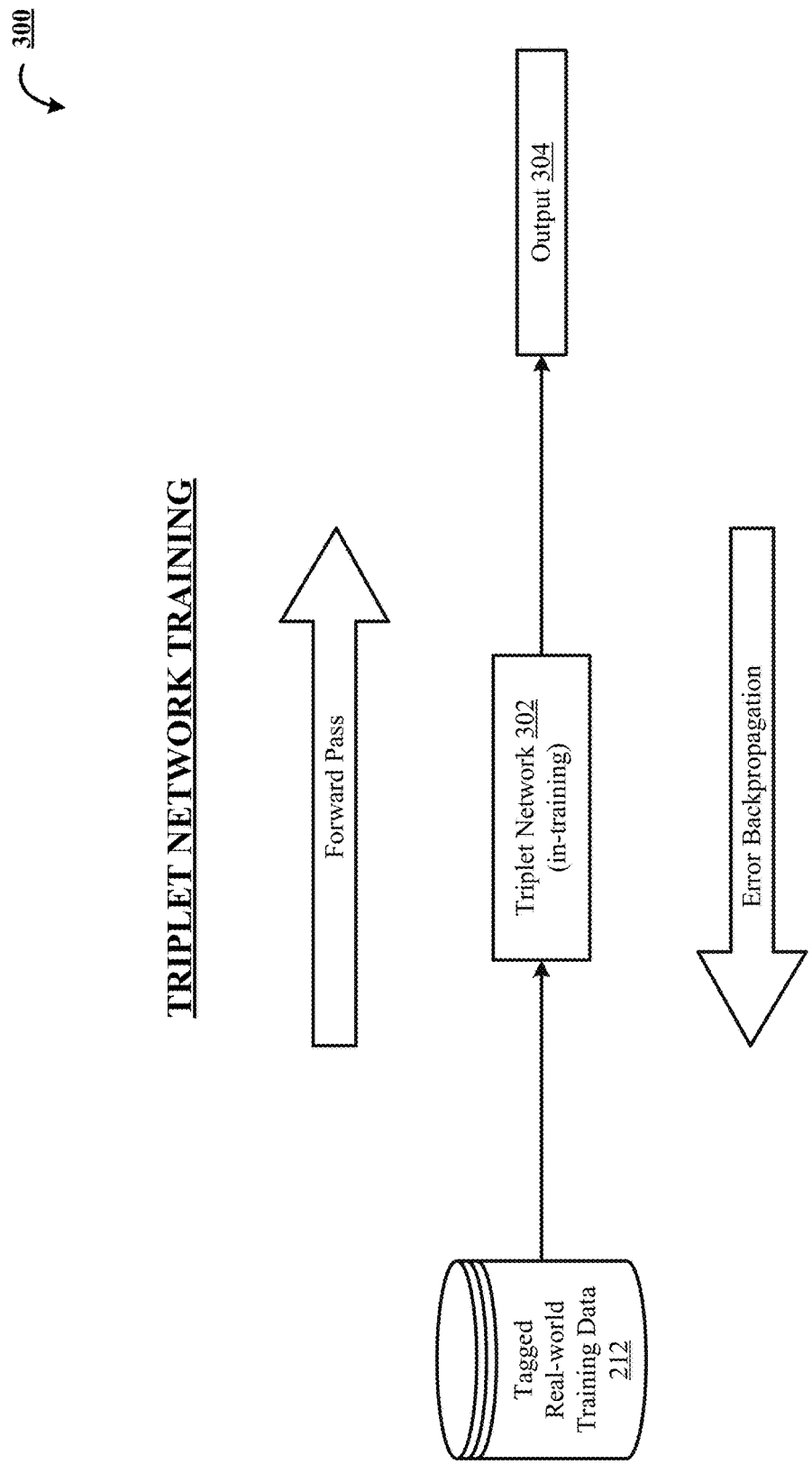
FIG. 3 depicts one implementation of training a triplet network using tagged real-world training data.

FIG. 3 depicts one implementation of training 300 a triplet network 302 using tagged real-world training data 212. As previously discussed, upon convergence (or termination) in FIG. 2, the most recent version of the tagged real-world training data 212 is used to train the triplet network 302. In one implementation, the training includes providing three inputs to the triple network 302, i.e., two frames or patches from the same track and one frame or patch from another track (e.g., from a different video sequence). This way, the triplet network 302 learns to generate embeddings (e.g., output 304) such that embeddings of frames from the same track are similar or closer to each other than to embedding of the frame from the another track.

In other implementations, the most recent version of the tagged real-world training data 212 is used to train different or additional networks such as a classification network that includes multiple fully-connected layers and a terminal softmax classification layer. Such a classification network can be tasked with classifying tracks and patches of the tracks into categories (e.g., dress clothing, pant clothing, roundtable furniture). A cross-entropy loss function can be used to evaluate the performance of the classification network over the classification task and calculate gradients for backpropagation. The trained classification network produces embeddings.

In some implementations, the triple network 302 is also trained using catalog data (images) 402. Additional information about the triplet network 302 and training the triplet network 302 can be found in commonly owned U.S. patent application Ser. Nos. 15/295,926; 15/295,930; 15/373,897; and 15/619,299, which are incorporated by reference for all purposes as if fully set forth herein.

Figure 4:
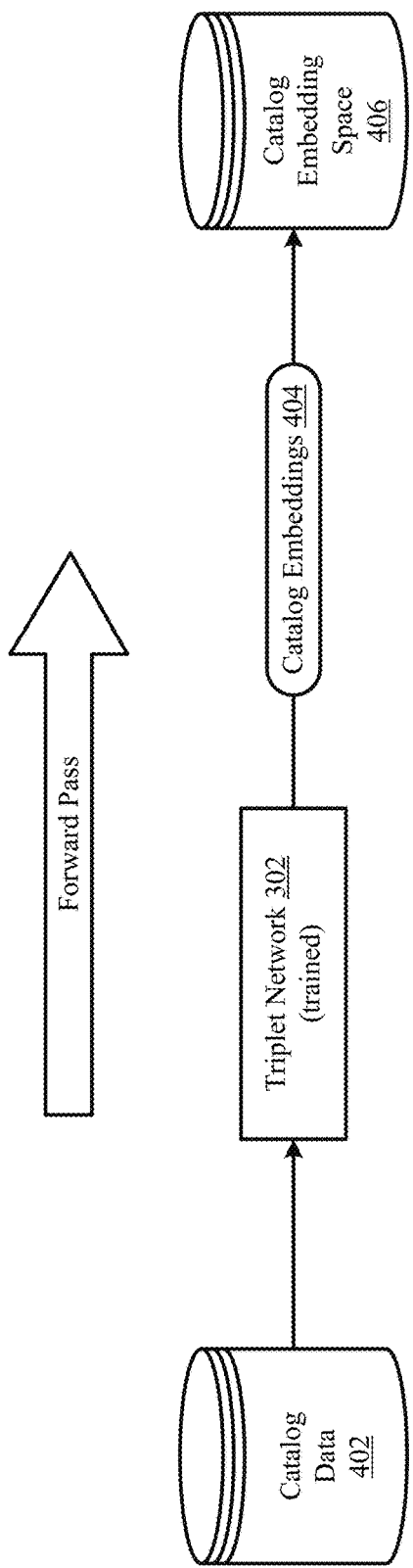
FIG. 4 illustrates one implementation of using the trained triplet network to embed catalog data (images) in a catalog embedding space.

FIG. 4 illustrates one implementation of using 400 the trained triplet network 302 to embed catalog data (images) 402 in a catalog embedding space 406 as catalog embeddings 404. Additional information about using the trained triplet network 302 to generate the catalog embedding space 406 and about the catalog embedding space 406 can be found in commonly owned U.S. patent application Ser. Nos. 15/295,926; 15/295,930; 15/373,897; and 15/619,299, which are incorporated by reference for all purposes as if fully set forth herein.

Figure 5:
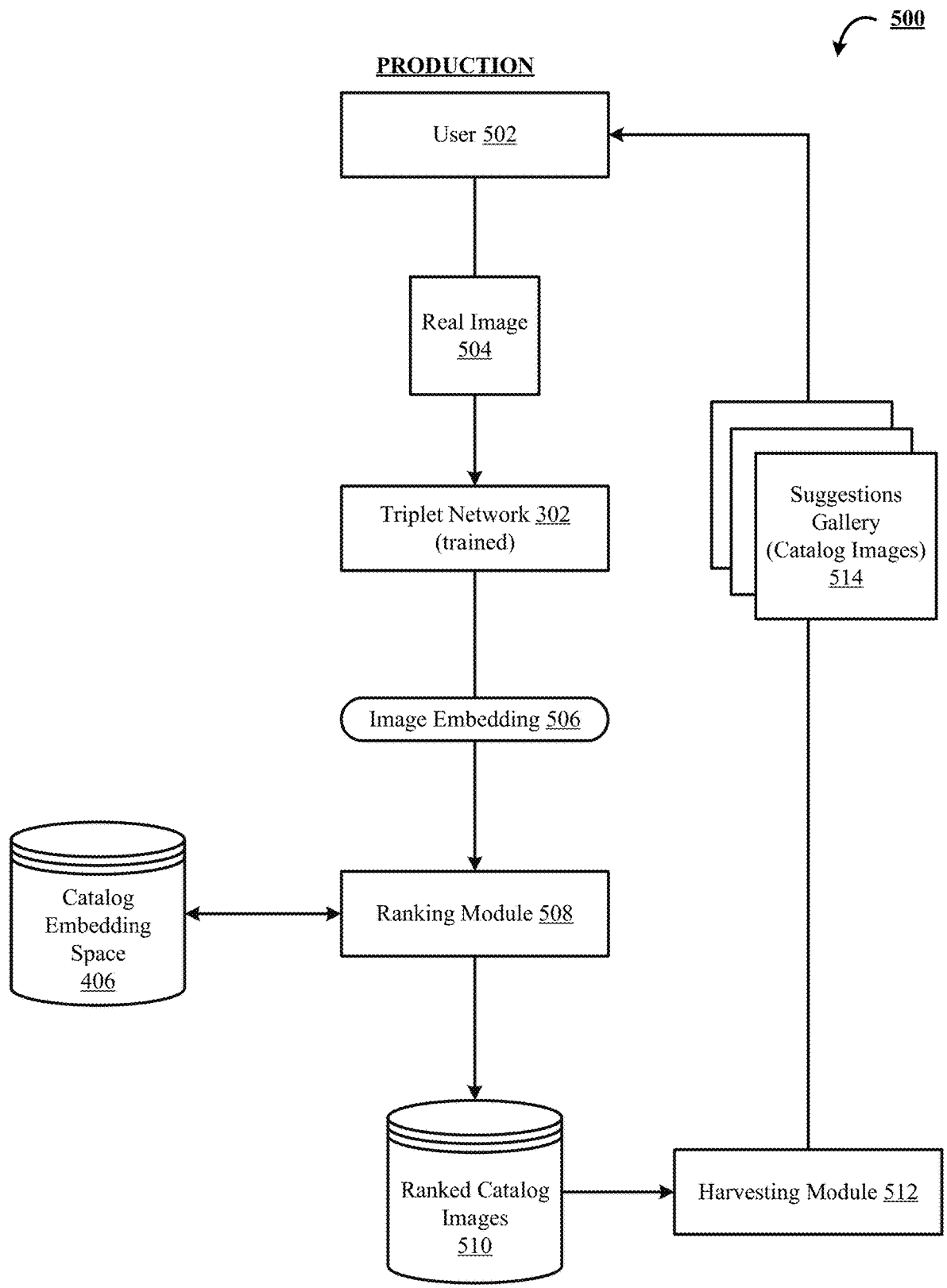
FIG. 5 shows one implementation of using the trained triplet network to improve the "Shop the Look" service.

FIG. 5 shows one implementation of using 500 the trained triplet network 302 to improve the "Shop the Look" service. At production, a user 502 selects a real image (wild image) 504. In response, the trained triplet network 302 produces a real-time image embedding 506 of the real image 504. Following this, a ranking module 508 compares the real-time image embedding 506 to embeddings of catalog images in the catalog embedding space 406 and produces a ranked set of catalog images 510 that are presented as suggestions 514 to the user 502 by a harvesting module 512. Additional information about exploring and exploiting an embedding space during production to produce image and/or screen suggestions in response to a user selection or user selected image and/or screen can be found in commonly owned U.S. patent application Ser. Nos. 15/295,926; 15/295,930; 15/373,897; and 15/619,299, which are incorporated by reference for all purposes as if fully set forth herein.

The following is a sample pseudo code of one implementation of the disclosed algorithm:

```
training_data = customer_training_data
validation_data = customer_validation_data
cloth_detector = build_cloth_detector(training_data)
tracker = build_tracker(cloth_detector)
cloth_detector_performance =
cloth_detector.evaluate(validation_data)
last_cloth_detector_performance = 0
while not has_converged(last_cloth_detector_performance,
cloth_detector_performance)
    last_cloth_detector_performance = cloth_detector_performance
    all_video_tracks = [ ]
    For video in all_videos:
        video_tracks = tracker .generate_all_tracks(video)
        all_video_tracks.add_all(video_tracks)
    additional_training_data = process_tracks(all_video_tracks)
    training_data = [training_data, additional_training_data]
    cloth_detector = build_cloth_detector(training_data)
    tracker = build_tracker(cloth_detector)
    cloth_detector_performance =
    cloth_detector.evaluate(validation_data)
ranking_training_data =
process_tracks_for_ranking(all_video_tracks)
ranker = build_ranker(ranking_training_data)
```

Figure 6:
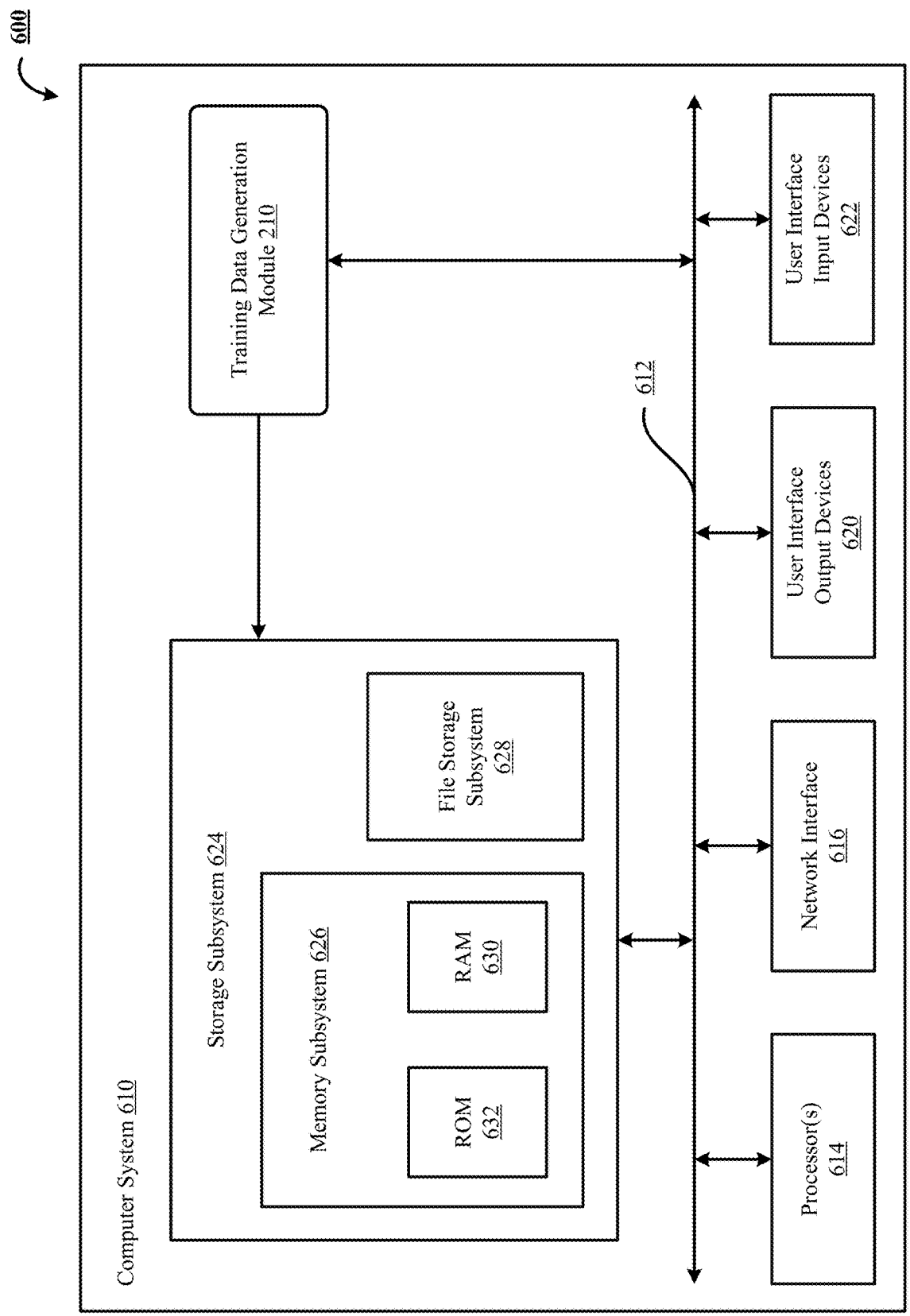
FIG. 6 is a simplified block diagram of a computer system that can be used to implement the technology disclosed.

FIG. 6 is a simplified block diagram 600 of a computer system that can be used to implement the technology disclosed and in particular the training data generation module 210. Computer system 610 typically includes at least one processor 614 that communicates with a number of peripheral devices via bus subsystem 612. These peripheral devices can include a storage subsystem 624 including, for example, memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to corresponding interface devices in other computer systems.

User interface input devices 622 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 614 alone or in combination with other processors.

Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem can use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Figure 7:
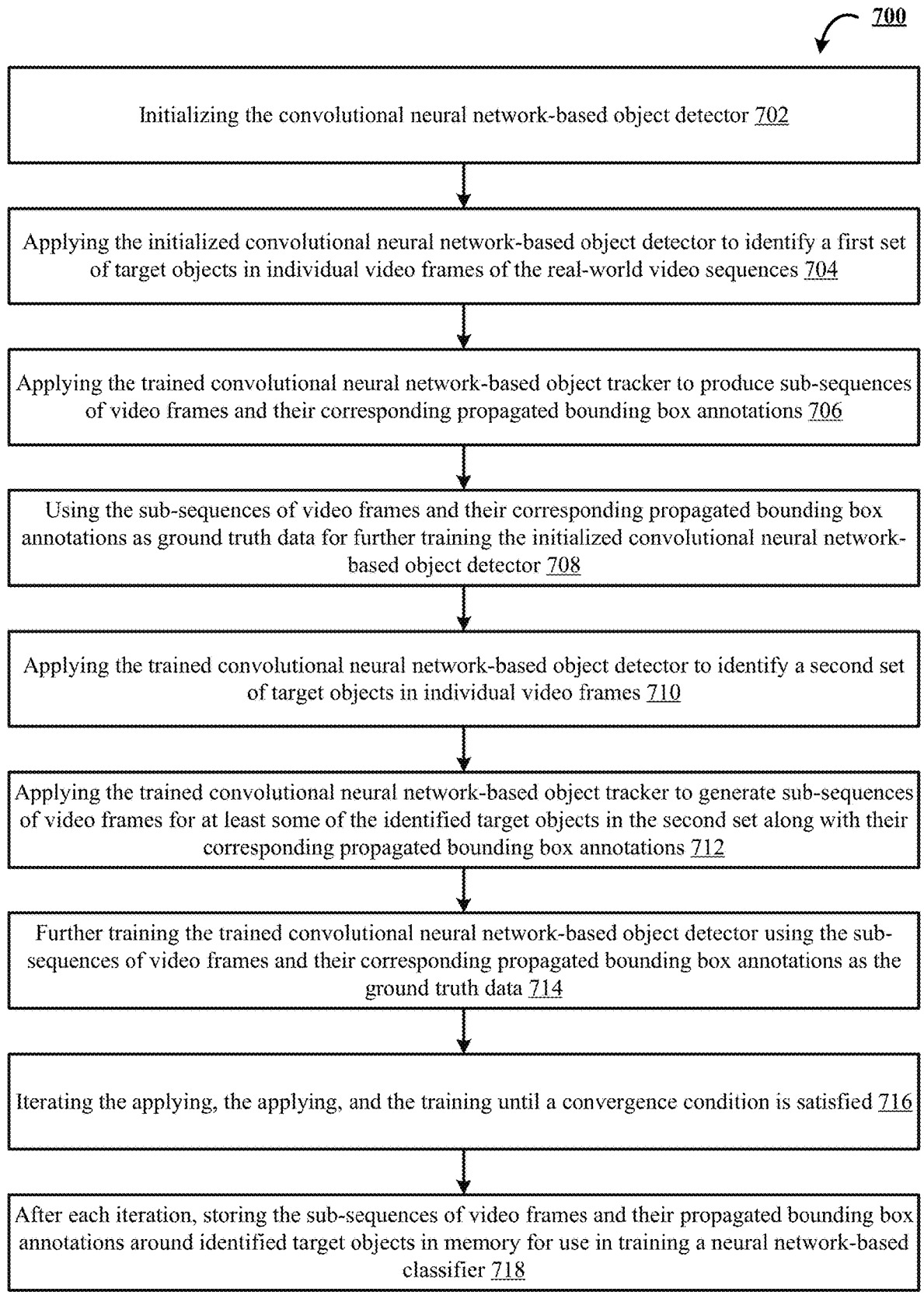
FIG. 7 illustrates one implementation of a neural network-implemented method of generating real-world training data with corresponding ground truth annotations.

FIG. 7 illustrates one implementation of a neural network-implemented method 700 of generating real-world training data with corresponding ground truth annotations.

At action 702, the method includes initializing a convolutional neural network-based object detector on controlled training data that comprises synthetic images. This includes using a backpropagation-based gradient-update technique to train the convolutional neural network-based object detector to identify target objects in the synthetic images using bounding box annotations.

At action 704, the method includes feeding, as input to an initialized convolutional neural network-based object detector, real-world video sequences to identify a first set of target objects in individual video frames of the real-world video sequences using bounding box annotations.

At action 706, the method includes feeding, as input to a trained convolutional neural network-based object tracker, the real-world video sequences with the target objects identified by the bounding box annotations to track at least some of the identified target objects in the first set between successive video frames of the real-world video sequences by propagating the bounding box annotations across the successive video frames. This produces for each of the at least some of the identified target objects, a sub-sequence of video frames that tracks a corresponding identified target object using propagated bounding box annotations.

At action 708, the method includes using sub-sequences of video frames produced for each of the at least some of the identified target objects and their corresponding propagated bounding box annotations as ground truth data for further training the initialized convolutional neural network-based object detector.

At action 710, the method includes applying the trained convolutional neural network-based object detector to the real-world video sequences to identify a second set of target objects in individual video frames.

At action 712, the method includes applying the trained convolutional neural network-based object tracker to the real-world video sequences to generate sub-sequences of video frames for at least some of the identified target objects in the second set along with their corresponding propagated bounding box annotations.

At action 714, the method includes further training the trained convolutional neural network-based object detector using the sub-sequences of video frames and their corresponding propagated bounding box annotations as the ground truth data.

At action 716, the method includes iterating the applying, the applying, and the training until a convergence condition is satisfied.

At action 718, the method includes, after each iteration, storing the sub-sequences of video frames and their propagated bounding box annotations around identified target objects in memory for use in training a neural network-based classifier.

This method implementation and other methods disclosed optionally include one or more of the following features. Method can also include features described in connection with systems disclosed. In the interest of conciseness, alternative combinations of method features are not individually enumerated. Features applicable to systems, methods, and articles of manufacture are not repeated for each statutory class set of base features. The reader will understand how features identified in this section can readily be combined with base features in other statutory classes.

A computer readable media (CRM) implementation includes a non-transitory computer readable storage medium storing instructions executable by a processor to perform a method as described above. Another CRM implementation may include a system including memory and one or more processors operable to execute instructions, stored in the memory, to perform a method as described above.

The size of the first set can be K and size of the second set can be M, such that M>K. In other implementations, M>>K.

The initializing, the training, the further training, and the continued training is performing using a backpropagation-based gradient-update technique to iteratively optimize a loss function that minimizes error between the ground truth data and bounding box annotations made for target objects identified in the sub-sequences of video frames by the initialized or the trained convolutional neural network-based object detector and to iteratively update parameters of the initialized or the trained convolutional neural network-based object detector based on the error.

The convergence condition can be satisfied after a ceiling number of iterations. The convergence condition can be satisfied when detection rate of the trained convolutional neural network-based object detector on a validation set exceeds a preset threshold.

In some implementations, the method includes assigning a label to each of the sub-sequences of video frames based on the corresponding target objects depicted by the video frames.

In some implementations, when the neural network-based classifier is a triplet network, the method includes using the sub-sequences of video frames and their propagated bounding box annotations around the identified target objects to train the triplet network to generate images similar to an input image.

In some implementations, the method includes storing parameters of the trained convolutional neural network-based object detector derived from training in memory for use in a Shop The Look service.

In some implementations, the method includes using the trained convolutional neural network-based object detector to identify a real-world target object in a real-world image selected by a user of the Shop The Look service, feeding the real-world image as input to the triplet network to produce a set of catalog images of one or more cataloged target objects similar to and/or complementing the real-world target object, and returning the set of catalog images toward the user as suggestions.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

I claim:

1. A neural network-implemented method of generating real-world training data with corresponding ground truth annotations for producing suggestions of catalog images to a user in real-time, the method including:

feeding, as input to an initialized convolutional neural network-based object detector, real-world video sequences to identify a first set of target objects in individual video frames of the real-world video sequences using bounding box annotations;

feeding, as input to a trained convolutional neural network-based object tracker, the real-world video sequences with the target objects identified by the bounding box annotations to track at least some of the identified target objects in the first set between successive video frames of the real-world video sequences by propagating the bounding box annotations across the successive video frames, thereby producing, for each of the at least some of the identified target objects, a sub-sequence of video frames that tracks a corresponding identified target object using propagated bounding box annotations;

using sub-sequences of video frames produced for each of the at least some of the identified target objects and their corresponding propagated bounding box annotations as ground truth data for further training the initialized convolutional neural network-based object detector;

applying the training convolutional neural network-based object detector to the real-world video sequences to identify a second set of target objects in individual video frames, applying the training convolutional neural network-based object tracker to the real-world video sequences to generate sub-sequences of video frames for at least some of the identified target objects in the second set along with their corresponding propagated bounding box annotations, and further training the trained convolutional neural network-based object detector using the sub-sequences of video frames and their corresponding propagated bounding box annotations as the ground truth data;

iterating the applying, the applying, and the training until a convergence condition is satisfied; and after each iteration, storing the sub-sequences of video frames and their propagated bounding box annotations around identified target objects in memory;

training an embedding model with the stored sub-sequences of video frames and their propagated bounding box annotations for image retrieval and generation of catalog images for populating an embedding space, wherein the embedding model has a triplet network architecture consisting of three convolutional neural networks;

producing, by the trained embedding model, a real-time embedding of a user selected catalog image;

comparing the real-time embedding to a catalog of images in the embedding space;

producing a ranked set of catalog images; and presenting the ranked set of catalog images to the user.

2. The neural network-implemented method of claim 1, wherein size of the first set is K and size of the second set is M, and M>K.

3. The neural network-implemented method of claim 1, further including:
using a backpropagation-based gradient-update technique to
iteratively optimize a loss function that minimizes error between the ground truth data and bounding box annotations made for target objects identified in the sub-sequences of video frames by the initialized or the training convolutional neural network-based object detector; and
iteratively update parameters of the initialized or the trained convolutional neural network-based object detector based on the error.

4. The neural network-implemented method of claim 1, further including:
initializing the convolutional neural network-based object detector on controlled training data that comprises synthetic images, including using the backpropagation-based gradient-update technique to train the convolutional neural network-based object detector to identify target objects in the synthetic images using bounding box annotations.

5. The neural network-implemented method of claim 1, wherein the convergence condition is satisfied after a ceiling number of iterations.

6. The neural network-implemented method of claim 1, wherein the convergence condition is satisfied when detection rate of the trained convolutional neural network-based object detector on a validation set exceeds a present threshold.

7. The neural network-implemented method of claim 1, further including:
assigning a label to each of the sub-sequences of video frames based on the corresponding target objects depicted by the video frames.

8. A system including one or more processors coupled to memory, the memory loaded with computer instructions to generate real-world training data with corresponding ground truth annotations for producing suggestions of catalog images to a user in real-time, the instructions, when executed on the processors, implement actions comprising:

feeding, as input to an initialized convolutional neural network-based object detector, real-world video sequences to identify a first set of target objects in individual video frames of the real-world video sequences using bounding box annotations;

feeding, as input to a trained convolutional neural network-based object tracker, the real-world video sequences with the target objects identified by the bounding box annotations to track at least some of the identified target objects in the first set between successive video frames of the real-world video sequences by propagating the bounding box annotations across the successive video frames, thereby producing, for each of the at least some of the identified target objects, a sub-sequence of video frames that tracks a corresponding identified target object using propagated bounding box annotations;

using sub-sequences of video frames produced for each of the at least some of the identified target objects and their corresponding propagated bounding box annotations as ground truth data for further training the initialized convolutional neural network-based object detector;

applying the trained convolutional neural network-based object detector to the real-world video sequences to identify a second set of target objects in individual video frames, applying the trained convolutional neural network-based object tracker to the real-world video sequences to generate sub-sequences of video frames for at least some of the identified target objects in the second set along with their corresponding propagated bounding box annotations, and further training the trained convolutional neural network-based object detector using the sub-sequences of video frames and their corresponding propagated bounding box annotations as the ground truth data;

iterating the applying, the applying, and the training until a convergence condition is satisfied; and after each iteration, storing the sub-sequences of video frames and their propagated bounding box annotations around identified target objects in memory;

training an embedding model with the stored sub-sequences of video frames and their propagated bounding box annotations for image retrieval and generation of catalog images for populating an embedding space, wherein the embedding model has a triplet network architecture consisting of three convolutional neural networks;

producing, by the trained embedding model, a real-time embedding of a user selected catalog image;

comparing the real-time embedding to a catalog of images in the embedding space;

producing a ranked set of catalog images; and presenting the ranked set of catalog images to the user.

9. The system of claim 8, wherein size of the first set is K and size of the second set is M, and M>K.

10. The system of claim 8, further implementing actions comprising:
using a backpropagation-based gradient-update technique to
iteratively optimize a loss function that minimizes error between the ground truth data and bounding box annotations made for target objects identified in the sub-sequences of video frames by the initialized or the trained convolutional neural network-based object detector; and iteratively update parameters of the initialized or the trained convolutional neural network-based object detector based on the error.

11. The system of claim 8, wherein the neural network-based classifier is a triplet network, further implementing actions comprising:
using the sub-sequences of video frames and their propagated bounding box annotations around the identified target objects to train the triplet network to generate images similar to an input image.

12. A non-transitory computer readable storage medium impressed with computer program instructions to generate real-world training data with corresponding ground truth annotations for producing suggestions of catalog images to a user in real-time, the instructions, when executed in a processor, implement a method comprising:
feeding, as input to an initialized convolutional neural network-based object detector, real-world video sequences to identify a first set of target objects in individual video frames of the real-world video sequences using bounding box annotations;
feeding, as input to a trained convolutional neural network-based object tracker, the real-world video sequences with the target objects identified by the bounding box annotations to track at least some of the identified target objects in the first set between successive video frames of the real-world video sequences by propagating the bounding box annotations across the successive video frames, thereby producing, for each of the at least some of the identified target objects, a sub-sequence of video frames that tracks a corresponding identified target object using propagated bounding box annotations;
using sub-sequences of video frames produced for each of the at least some of the identified target objects and their corresponding propagated bounding box annotations as ground truth data for further training the initialized convolutional neural network-based object detector;
applying the trained convolutional neural network-based object detector to the real-world video sequences to identify a second set of target objects in individual video frames, applying the trained convolutional neural network-based object tracker to the real-world video sequences to generate sub-sequences of video frames for at least some of the identified target objects in the second set along with their corresponding propagated bounding box annotations, and further training the trained convolutional neural network-based object detector using the sub-sequences of video frames and their corresponding propagated bounding box annotations as the ground truth data;
iterating the applying, the applying, and the training until a convergence condition is satisfied; and
after each iteration, storing the sub-sequences of video frames and their propagated bounding box annotations around identified target objects in memory;
training an embedding model with the stored sub-sequences of video frames and their propagated bounding box annotations for image retrieval and generation of catalog images for populating an embedding space, wherein the embedding model has a triplet network architecture consisting of three convolutional neural networks;
producing, by the trained embedding model, a real-time embedding of a user selected catalog image;
comparing the real-time embedding to a catalog of images in the embedding space;
producing a ranked set of catalog images; and
presenting the ranked set of catalog images to the user.

13. The non-transitory computer readable storage medium of claim 12, wherein size of the first set is K and size of the second set is M, and M>K.

* * * * *